(12) United States Patent
Perrier et al.

(10) Patent No.: US 8,152,062 B2
(45) Date of Patent: Apr. 10, 2012

(54) PORTABLE INFORMATION TERMINAL MOUNTABLE ON SHOPPING CART AND REMOVABLE MEMORY DEVICE USABLE WITH SAME

(75) Inventors: R. Sylvain Perrier, Newmarket (CA); Jeremy List, Newmarket (CA); Mark Edey, Ottawa (CA)

(73) Assignee: Mercatus Technologies Inc., Toronto (CA)

( * ) Notice: Subject to any disclaimer, the term of this patent is extended or adjusted under 35 U.S.C. 154(b) by 433 days.

(21) Appl. No.: 11/411,900

(22) Filed: Apr. 27, 2006

(65) Prior Publication Data
US 2006/0264120 A1    Nov. 23, 2006

Related U.S. Application Data

(60) Provisional application No. 60/675,849, filed on Apr. 29, 2005.

(51) Int. Cl.
*G06K 15/00* (2006.01)
(52) U.S. Cl. .............. 235/383; 361/679.31; 361/679.39; 361/679.58; 361/759
(58) Field of Classification Search .................. 361/684, 361/686, 679.57, 679.58, 679.31, 679.39, 361/759; 439/752, 731; 235/383; 35/383
See application file for complete search history.

(56) References Cited

U.S. PATENT DOCUMENTS

| 2,759,281 A | 8/1956 | Akers, Jr. |
| 3,251,543 A | 5/1966 | Bush |
| 3,710,108 A | 1/1973 | Haarhaus et al. |
| 3,836,755 A | 9/1974 | Ehrat et al. |
| 4,071,740 A | 1/1978 | Gogulski |
| 4,139,149 A | 2/1979 | Crepeau et al. |
| 4,334,278 A | 6/1982 | Marmon |
| 4,373,133 A | 2/1983 | Clyne et al. |
| 4,500,880 A | 2/1985 | Gomersall et al. |
| 4,528,638 A | 7/1985 | Hatta et al. |

(Continued)

FOREIGN PATENT DOCUMENTS

CA         1300235         5/1992

(Continued)

OTHER PUBLICATIONS

Cuesol; "Enhancing the Customer Experience"; www.cuesol.com; 2005.

(Continued)

*Primary Examiner* — Daniel Hess
*Assistant Examiner* — Rafferty Kelly
(74) *Attorney, Agent, or Firm* — Osha•Liang LLP

(57) ABSTRACT

A system made up of a portable information terminal mountable on a shopping cart for providing product and advertising information while the cart is moved inside a store and an external memory device connectable to the portable information terminal, the external memory device including a memory housing, a non-volatile memory storing data in the memory housing, and a first electrical connector projecting from the housing for allowing a processor to access the stored data; the portable terminal including a terminal housing including a display, a processor in the terminal housing for causing the display to display product information and advertisements, and a second electrical connector inside the housing complementary to the first electrical connector for connecting an external memory device to the processor, the terminal housing including a passage providing access to the second electrical connector from outside the terminal housing and at least one door recessed in the passage shiftable from a first position blocking the passage to a second position by inserting the external memory device into the passage.

16 Claims, 12 Drawing Sheets

U.S. PATENT DOCUMENTS

| | | | |
|---|---|---|---|
| 4,703,423 A | 10/1987 | Bado et al. | |
| 4,750,151 A | 6/1988 | Baus | |
| 4,882,724 A | 11/1989 | Vela et al. | |
| D307,895 S | 5/1990 | Kitagawa et al. | |
| 4,973,952 A | 11/1990 | Malec et al. | |
| 4,988,025 A | 1/1991 | Lipton et al. | |
| 4,996,642 A | 2/1991 | Hey | |
| 5,047,614 A | 9/1991 | Bianco | |
| 5,149,947 A | 9/1992 | Collins, Jr. | |
| 5,158,310 A | 10/1992 | Tannehill et al. | |
| 5,250,789 A | 10/1993 | Johnsen | |
| D341,691 S | 11/1993 | Begum et al. | |
| 5,264,822 A | 11/1993 | Vogelman et al. | |
| 5,287,266 A | 2/1994 | Malec et al. | |
| 5,294,781 A | 3/1994 | Takahashi et al. | |
| 5,295,064 A | 3/1994 | Malec et al. | |
| D346,366 S | 4/1994 | Kim et al. | |
| 5,301,443 A | 4/1994 | Gori | |
| D347,505 S | 5/1994 | Machen et al. | |
| D347,719 S | 6/1994 | Machen et al. | |
| D354,485 S | 1/1995 | Maeno et al. | |
| 5,406,271 A | 4/1995 | Sonnendorfer et al. | |
| 5,420,606 A | 5/1995 | Begum et al. | |
| 5,424,524 A * | 6/1995 | Ruppert et al. | 705/17 |
| 5,457,307 A | 10/1995 | Dumont | |
| 5,483,472 A | 1/1996 | Overman | |
| 5,544,040 A | 8/1996 | Gerbaulet | |
| D375,601 S | 11/1996 | Myers et al. | |
| 5,572,653 A | 11/1996 | DeTemple et al. | |
| D376,459 S | 12/1996 | Myers | |
| 5,583,763 A | 12/1996 | Atcheson et al. | |
| 5,630,068 A | 5/1997 | Vela et al. | |
| 5,630,071 A | 5/1997 | Sakai et al. | |
| 5,664,948 A | 9/1997 | Dimitriadis et al. | |
| 5,703,564 A | 12/1997 | Begum et al. | |
| D390,861 S | 2/1998 | Liao et al. | |
| 5,714,745 A | 2/1998 | Ju et al. | |
| D392,259 S | 3/1998 | Simmon | |
| 5,729,697 A | 3/1998 | Schkolnick et al. | |
| 5,739,513 A | 4/1998 | Watanabe | |
| 5,749,081 A | 5/1998 | Whiteis | |
| 5,773,954 A | 6/1998 | VanHorn | |
| 5,804,803 A | 9/1998 | Cragun et al. | |
| 5,821,512 A | 10/1998 | O'Hagan et al. | |
| 5,821,513 A | 10/1998 | O'Hagan et al. | |
| 5,823,513 A | 10/1998 | Stenquist | |
| 5,836,051 A | 11/1998 | Myers et al. | |
| 5,841,115 A | 11/1998 | Shepley | |
| D404,761 S | 1/1999 | Tarpenning et al. | |
| 5,859,414 A | 1/1999 | Grimes et al. | |
| 5,884,282 A | 3/1999 | Robinson | |
| 5,890,135 A | 3/1999 | Powell | |
| 5,898,158 A | 4/1999 | Shimizu et al. | |
| 5,918,211 A | 6/1999 | Sloane | |
| 5,963,948 A | 10/1999 | Shilcrat | |
| 5,971,277 A | 10/1999 | Cragun et al. | |
| 5,978,766 A | 11/1999 | Luciw | |
| 5,979,757 A | 11/1999 | Tracy et al. | |
| 5,984,182 A | 11/1999 | Murrah et al. | |
| 5,995,015 A | 11/1999 | DeTemple et al. | |
| 6,000,610 A | 12/1999 | Talbott et al. | |
| 6,012,051 A | 1/2000 | Sammon, Jr. et al. | |
| 6,012,244 A | 1/2000 | Begum et al. | |
| 6,032,127 A | 2/2000 | Schkolnick et al. | |
| 6,105,867 A | 8/2000 | Shimizu et al. | |
| 6,112,857 A | 9/2000 | Morrison | |
| 6,119,935 A | 9/2000 | Jelen et al. | |
| 6,123,259 A | 9/2000 | Ogasawara | |
| 6,129,274 A | 10/2000 | Suzuki | |
| 6,129,276 A | 10/2000 | Jelen et al. | |
| 6,168,079 B1 | 1/2001 | Becker et al. | |
| 6,177,880 B1 | 1/2001 | Begum | |
| 6,189,788 B1 | 2/2001 | Sherman et al. | |
| D438,849 S | 3/2001 | Adachi et al. | |
| 6,199,753 B1 | 3/2001 | Tracy et al. | |
| 6,236,330 B1 | 5/2001 | Cohen | |
| 6,256,334 B1 | 7/2001 | Adachi et al. | |
| 6,259,381 B1 | 7/2001 | Small | |
| 6,317,722 B1 | 11/2001 | Jacobi et al. | |
| 6,323,753 B2 | 11/2001 | Begum | |
| 6,327,570 B1 | 12/2001 | Stevens | |
| D454,563 S | 3/2002 | Brown et al. | |
| 6,356,879 B2 | 3/2002 | Aggarwal et al. | |
| 6,370,513 B1 | 4/2002 | Kolawa et al. | |
| 6,377,451 B1 * | 4/2002 | Furuya | 361/686 |
| 6,386,450 B1 | 5/2002 | Ogasawara | |
| D460,759 S | 7/2002 | West et al. | |
| 6,421,247 B1 * | 7/2002 | Fuchimukai | 361/759 |
| 6,434,530 B1 | 8/2002 | Sloane et al. | |
| 6,435,407 B1 | 8/2002 | Fiordelisi | |
| 6,453,588 B1 | 9/2002 | Lykens | |
| 6,456,981 B1 | 9/2002 | Dejaeger et al. | |
| D464,646 S | 10/2002 | Lin | |
| 6,484,939 B1 | 11/2002 | Blaeuer | |
| 6,502,076 B1 | 12/2002 | Smith | |
| 6,502,124 B1 | 12/2002 | Shimakawa et al. | |
| 6,507,279 B2 | 1/2003 | Loof | |
| 6,513,015 B2 | 1/2003 | Ogasawara | |
| 6,533,173 B2 | 3/2003 | Benyak | |
| 6,539,417 B2 | 3/2003 | Stern | |
| 6,587,835 B1 | 7/2003 | Treyz et al. | |
| 6,591,247 B2 | 7/2003 | Stern | |
| 6,595,417 B2 | 7/2003 | O'Hagan et al. | |
| 6,619,546 B1 | 9/2003 | Nguyen et al. | |
| D480,760 S | 10/2003 | Wieth et al. | |
| D481,057 S | 10/2003 | Brady et al. | |
| D482,172 S | 11/2003 | Johnson et al. | |
| D483,361 S | 12/2003 | Yao et al. | |
| 6,659,344 B2 | 12/2003 | Otto et al. | |
| 6,659,346 B1 | 12/2003 | Williams | |
| 6,725,206 B1 | 4/2004 | Coveley | |
| 6,732,120 B1 | 5/2004 | Du et al. | |
| 6,741,975 B1 | 5/2004 | Nakisa et al. | |
| D492,303 S | 6/2004 | Schlieffers et al. | |
| D494,970 S | 8/2004 | Chen et al. | |
| D495,703 S | 9/2004 | Ma et al. | |
| 6,813,608 B1 | 11/2004 | Baranowski | |
| 6,820,062 B1 | 11/2004 | Gupta et al. | |
| 6,837,436 B2 | 1/2005 | Swartz et al. | |
| 6,845,656 B2 | 1/2005 | Matsumura et al. | |
| 6,850,923 B1 | 2/2005 | Nakisa et al. | |
| 6,854,656 B2 | 2/2005 | Matsumori et al. | |
| 6,869,013 B2 | 3/2005 | Allen et al. | |
| 6,873,967 B1 | 3/2005 | Kalagnanam et al. | |
| 6,910,697 B2 | 6/2005 | Varatharajah et al. | |
| 6,912,398 B1 | 6/2005 | Domnitz | |
| 6,912,507 B1 | 6/2005 | Phillips et al. | |
| 6,915,135 B1 | 7/2005 | McKee et al. | |
| 6,928,343 B2 | 8/2005 | Cato | |
| D509,827 S | 9/2005 | Johnson | |
| D510,784 S | 10/2005 | Van Landingham, Jr. | |
| D511,547 S | 11/2005 | Andersson et al. | |
| 2001/0007450 A1 | 7/2001 | Begum | |
| 2001/0028301 A1 | 10/2001 | Geiger et al. | |
| 2002/0003166 A1 | 1/2002 | Miller et al. | |
| 2002/0065714 A1 | 5/2002 | Goodwin, III | |
| 2002/0147642 A1 | 10/2002 | Avallone et al. | |
| 2002/0165778 A1 | 11/2002 | O'Hagan et al. | |
| 2002/0174021 A1 | 11/2002 | Chu et al. | |
| 2002/0178013 A1 | 11/2002 | Hoffman et al. | |
| 2002/0194075 A1 | 12/2002 | O'Hagan et al. | |
| 2002/0194604 A1 | 12/2002 | Sanchez et al. | |
| 2003/0004831 A1 | 1/2003 | Owens | |
| 2003/0050995 A1 | 3/2003 | Mateos | |
| 2003/0105667 A1 | 6/2003 | Millikan | |
| 2003/0106022 A1 | 6/2003 | Goodacre et al. | |
| 2003/0130909 A1 | 7/2003 | Caci et al. | |
| 2003/0131215 A1 | 7/2003 | Bellew | |
| 2003/0132298 A1 | 7/2003 | Swartz et al. | |
| 2004/0073489 A1 | 4/2004 | Varatharajah et al. | |
| 2004/0073572 A1 | 4/2004 | Jiang | |
| 2004/0093274 A1 | 5/2004 | Vanska et al. | |
| 2004/0103031 A1 | 5/2004 | Weinschenk | |
| 2004/0111320 A1 | 6/2004 | Schlieffers et al. | |
| 2004/0128210 A1 | 7/2004 | Gabos et al. | |
| 2004/0215530 A1 | 10/2004 | Rawson et al. | |
| 2005/0040230 A1 | 2/2005 | Swartz et al. | |

FOREIGN PATENT DOCUMENTS

| | | |
|---|---|---|
| EP | 0870264 | 10/1998 |
| EP | 1501034 | 1/2005 |
| EP | 1519283 | 3/2005 |
| GB | 2307575 A | 5/1997 |
| JP | 59038988 A | 3/1984 |
| JP | 63122842 A | 5/1988 |
| JP | 63135991 A | 6/1988 |
| JP | 2000-155683 | 6/2000 |
| JP | 2001067437 A | 3/2001 |
| JP | 2001160116 A | 6/2001 |
| JP | 2001250631 A | 9/2001 |
| JP | 2005116240 A | 4/2005 |
| JP | 2006512637 A | 4/2006 |
| WO | 9611130 A1 | 4/1996 |
| WO | WO-96/11130 | 4/1996 |
| WO | WO-97/29452 A1 | 8/1997 |
| WO | WO-0067176 | 11/2000 |
| WO | WO-01/82140 | 11/2001 |
| WO | WO-02/03224 | 1/2002 |
| WO | WO-02/06983 | 1/2002 |
| WO | WO-0248991 | 6/2002 |
| WO | WO-02082210 A1 | 10/2002 |
| WO | WO-03042775 | 5/2003 |
| WO | WO-2004/053632 | 6/2004 |
| WO | WO-2004090803 | 10/2004 |
| WO | WO-2006/031657 | 3/2006 |

OTHER PUBLICATIONS

Klever Marketing; "Emarketing's Billion-Dollar Opportunity"; www.kleverkart.com; 2005; and Fujitsu; "The Fujitsu Difference—U-Scan Shopper"; www.fujitsu.com; 2005.

Wincor Nixdorf; "SNIKEY"; www.wincor-nixdorf.com; Apr. 7, 2005.

Wincor Nixdorf; "POS Terminal Beetle/IPOS"; www.wincor-nixdorf.com; Oct. 15, 2004.

Wincor Nixdorf; "Beetle/NETPOS Scalable Thin Client Terminal"; www.wincor-nixdorf.com; Apr. 15, 2004.

Interactive Store Guide and item Locator for Deli Kiosk, www.dumac.com.

Intermedia kiosks—news—Supermarket News, (Apr. 2001).

Metro Group Future Store Initiative, Personal Shopping Assisstant, www.future-store.org.

IBM, "Stop & Shop grocery drivers sales and boosts customer loyalty with IBM Personal Shopping Assistant", On Demand Business™, 2004 [retrieved on Sep. 26, 2006]. http://www-03.ibm.com/products/retail/files/G107-0380-61.pdf.

Kourouthanassis, P. at al., "Developing Consumer-Friendly Pervasive Retail Systems", IEEE Pervasive Computing; vol. 2, No. 2, Apr.-Jun. 2003, pp. 32-39.

Notification of Reasons of Refusal issued for Japanese Patent Application No. 2008-508337; dated Sep. 6, 2011, and English translation thereof, 5 pages.

* cited by examiner

PORTABLE INFORMATION TERMINAL MOUNTABLE ON SHOPPING CART AND REMOVABLE MEMORY DEVICE USABLE WITH SAME

CROSS REFERENCE TO RELATED APPLICATIONS

The present application claims the benefit of U.S. Provisional Patent Application No. 60/675,849 filed Apr. 29, 2005, the entire contents of which is hereby incorporated by reference.

FIELD OF THE INVENTION

The present invention is directed toward a portable information terminal mountable on a shopping cart and to an external memory device usable with same, and, more specifically, toward a portable information terminal having an opening configured to receive a portable memory device, the opening being protected by a door, and toward a portable memory device configured to open the door when inserted into the opening.

BACKGROUND OF THE INVENTION

Shopping carts have remained essentially unchanged in form for many years. Recently, however, with the availability of inexpensive, compact computing power, attempts have been made to add small computers to shopping carts to assist users with shopping. For example, it is known to attach bar code readers to shopping carts to allow users to perform price checks and/or to perform a self-check out. One example of such a system is disclosed in U.S. Pat. No. 5,361,871 to Gupta, the contents of which are hereby incorporated by reference. However, the Gupta device appears likely to interfere with proper cart nesting and requires an electrical contact depending from the bottom of the cart for recharging which would likely be damaged in moving the cart through store aisles and/or over curbs in a store parking lot. It is not believed that systems such as the one disclosed in Gupta have been widely adopted.

Related shopper-assisting devices that clip or otherwise detachably mount to a shopping cart handle are also known. However, these must be taken from a rack or other storage location by a user and attached to a cart handle before use. When a shopper reaches the check-out line, store personnel must detach the unit from the car and return the unit to a storage and/or charging station or rely on the customer to perform these actions. It is believed that these inconveniences have kept such devices from being widely adopted.

It would therefore be desirable to provide an electronic shopper assisting device that is easy to use and maintain and that does not suffer from the aforementioned drawbacks.

SUMMARY OF THE INVENTION

These problems and others are addressed by the present invention, a first feature of which is a system comprising a portable information terminal mountable on a shopping cart for providing product and advertising information while the cart is moved inside a store and an external memory device connectable to the portable information terminal. The external memory device includes a memory housing, a non-volatile memory storing data in the memory housing and a first electrical connector projecting from the housing for allowing a processor to access the stored data. The portable terminal includes a terminal housing including a display, a processor in the terminal housing for causing the display to display product information and advertisements, and a second electrical connector inside the housing complementary to the first electrical connector for connecting an external memory device to the processor. The terminal housing including a passage providing access to the second electrical connector from outside the terminal housing and at least one door recessed in the passage shiftable from a first position blocking the passage to a second position by inserting the external memory device into the passage.

Another aspect of the invention comprises a portable information terminal mountable on a shopping cart for providing product and advertising information while the cart is moved inside a store. The terminal comprises a housing including a display, a processor in the housing for causing the display to display product information and advertisements and an electrical connector inside the housing for connecting an external memory device to the processor. The housing includes a passage providing access to the electrical connector from outside the housing and a door recessed in the passage and shiftable between a first position blocking the passage and a second position by inserting an external memory device into the passage.

Another feature of the invention comprises an external memory device usable with a system comprising a portable information terminal mountable on a shopping cart for providing product and advertising information while the cart is moved inside a store and an external memory device connectable to the portable information terminal. The external memory device includes a memory housing, a non-volatile memory storing data in the memory housing, a first electrical connector projecting from the housing for allowing a processor to access the stored data, and a projecting member projecting from said memory housing adjacent to said first electrical connector.

BRIEF DESCRIPTION OF THE DRAWINGS

Various aspects and features of embodiments of the present invention will be better understood after a reading of the following detailed description together with the accompanying drawings wherein.

DETAILED DESCRIPTION

Figure 1:
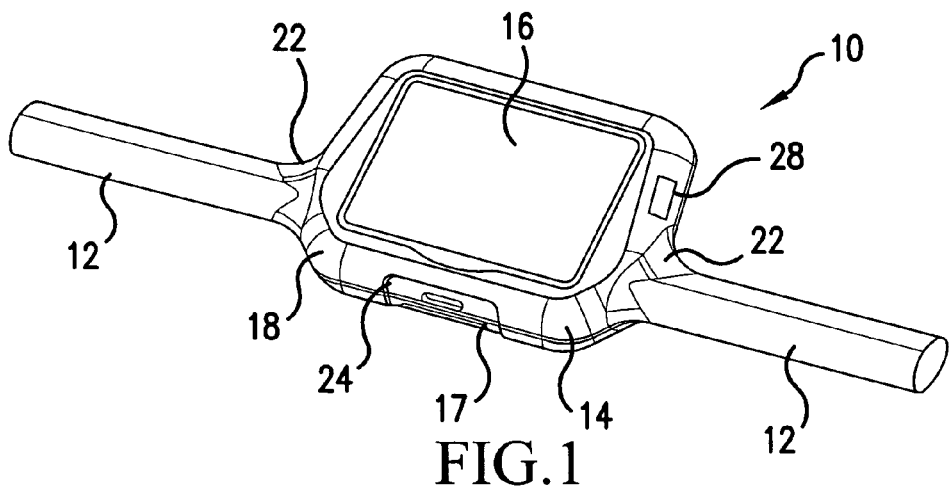
FIG. 1 is a front perspective view of a portable information terminal having a housing holding an electronic module and having passage for receiving a removable memory device according to an embodiment of the present invention.

Referring now to the drawings, wherein the showings are for purposes of illustrating preferred embodiments of the invention only, and not for the purpose of limiting same, FIG. 1 illustrates an information terminal in the form of a cart handle 10 comprising first and second grips 12 extending from a central housing 14. Central housing 14 includes a display 16, preferably a touch screen display, and a hollow interior for containing an electronic module or modules, a battery 15, illustrated in FIG. 17, a circuit board, a bar code reader 17, and other functional elements discussed herein. Housing 14 includes a first or front portion 18 formed integrally with grips 12 and a rear portion 20 mounted to front portion 18 either removably using fasteners such as screws or via a snap fit, or permanently using suitable adhesives, for example. When rear portion 20 is removably mounted, a suitable gasket is provided to ensure an watertight seal that will at the same time allow the unit to breathe and minimize condensation build up in the hollow interior of housing 14.

Figure 37:
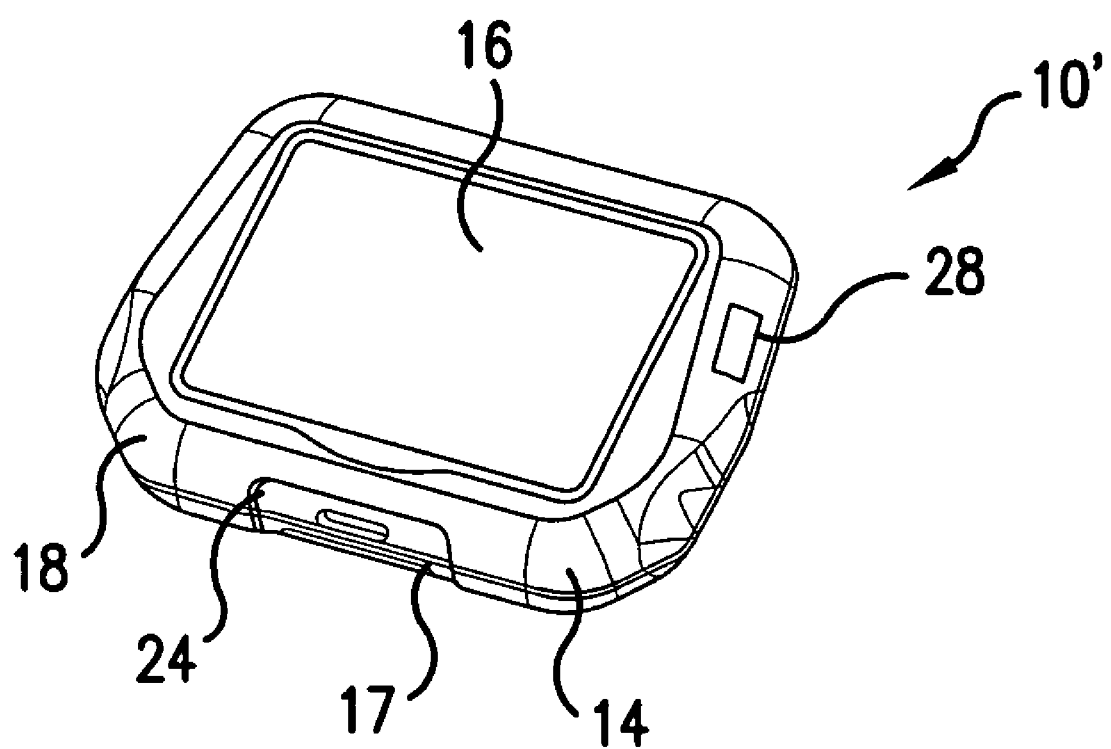
FIG. 37 is an information terminal without connected grip portions.

While the information terminal of FIG. 1 includes attached grip portions 12, it is also possible to form the information terminal 10 without grip portions 12 and instead provide mounting hardware (not shown) for connecting an information terminal 10 to an existing cart handle. An information terminal 10' without grip portions 12 is illustrated in FIG. 37.

Figure 2:
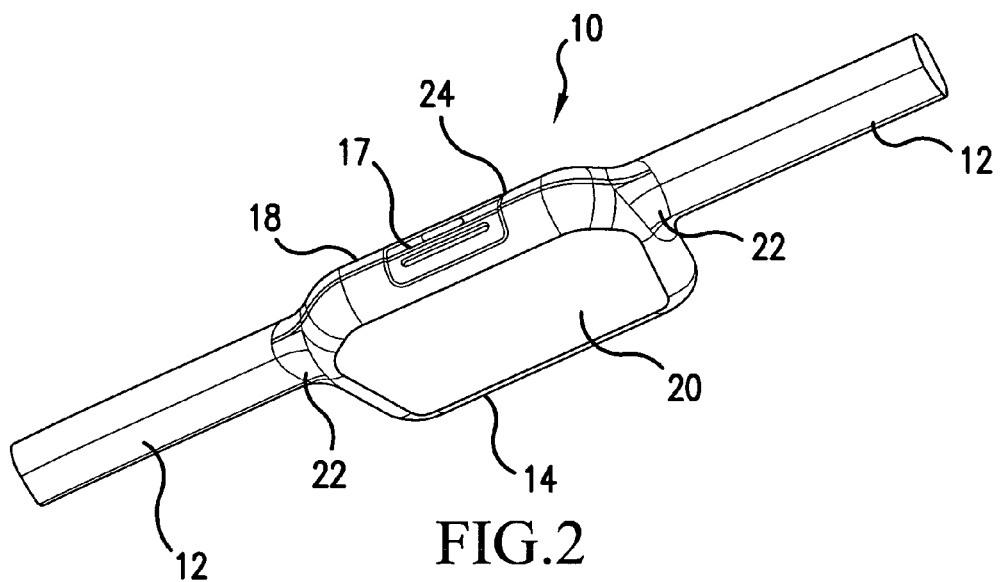
FIG. 2 is a rear perspective view of the information terminal of FIG. 1.
Figure 3:
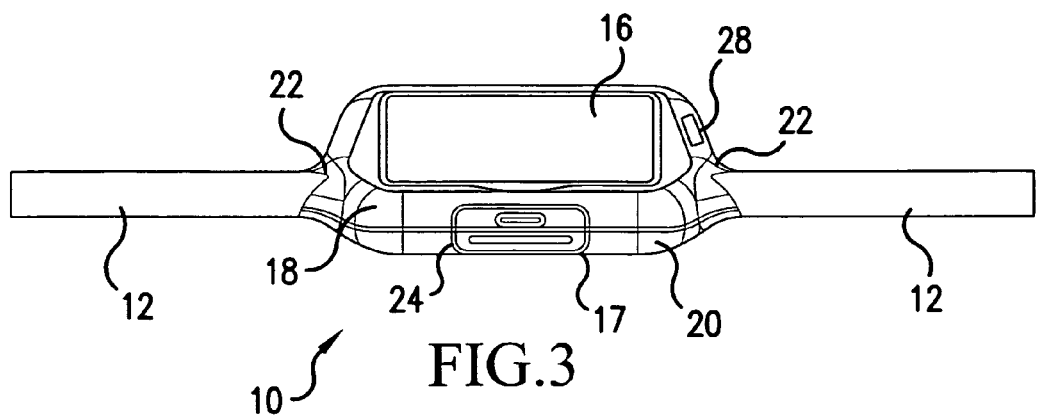
FIG. 3 is a front elevational view of the information terminal of FIG. 1.

Grips 12 include gripping portions 21 and join housing 14 at reinforced portions 22 to increase the strength of handle 10 and to reduce the likelihood of damage where the grips 12 join housing 14 when the handle is pushed or pulled or when downward pressure is applied against the housing 14. The gripping portions 21 have a circumference (or periphery if the grip portion does not have a circular cross section) of about 3 inches or 8 centimeters over most of their length to make them comfortable to grip for a user. Reinforced portions 22 are flared and have a larger circumference or periphery which increases from the periphery of the gripping portion 21 to the sidewall of housing 14. As will be appreciated from FIGS. 1 and 2, the flared reinforced portion 22 surrounds the gripping portions 21 of grips 12 on all sides so that a cross section of the gripping portion 21 projected toward housing 14 will pass through without intersecting the largest circumference or periphery of reinforced portions 22.

The housing and internal components are adapted to operate over a wide range of temperatures, −45° C., to 70° C., for example, so that the device can, for example, be stored outdoors in both extreme winter conditions and in direct sunlight in summer, and be resistant to both moisture and the impacts that are likely to be suffered by a shopping cart handle. The grips and housing are preferably formed from a suitable thermoplastic material.

Battery 15 is rechargeable and should be capable of operating the electronic modules for approximately 16 hours before recharging.

Figure 8:
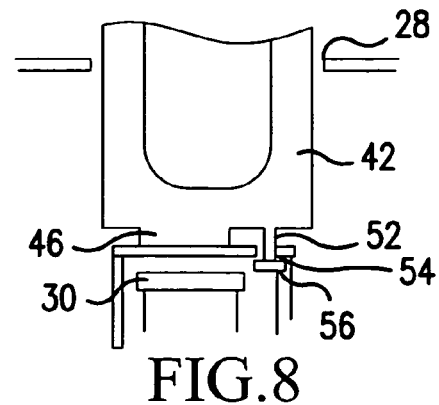
FIG. 8 illustrates the memory device of FIG. 5 being received in the passage of FIG. 7.
Figure 9:
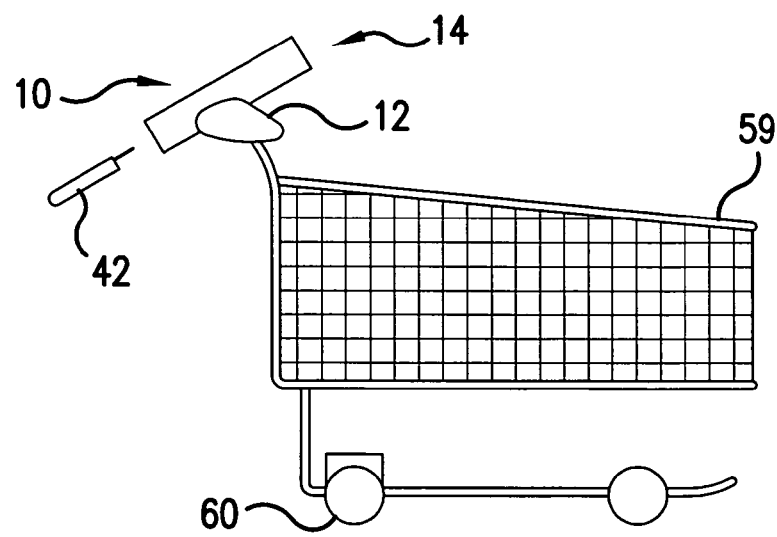
FIG. 9 illustrates an information terminal according to an embodiment of the present invention used with a cart wheel locking device wherein the wheel locking device is controlled by the information terminal.
Figure 10:
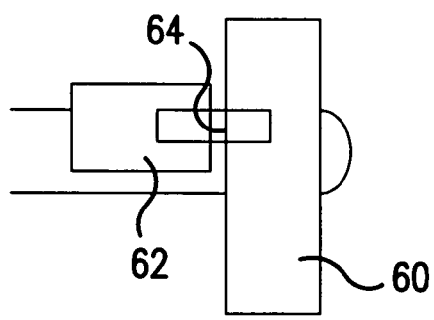
FIG. 10 illustrates the wheel locking device of FIG. 9 locking a cart wheel when a memory device is not present in the information terminal.
Figure 11:
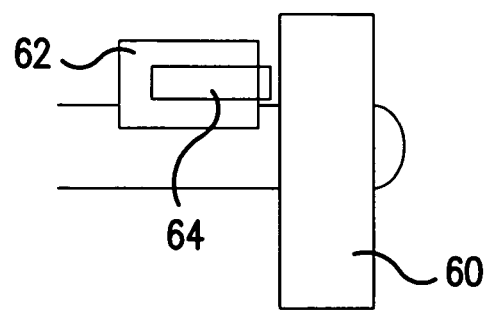
FIG. 11 illustrates the wheel locking device of FIG. 9 unlocking a cart wheel when a memory device is inserted into the passage in the information terminal housing.
Figure 23:
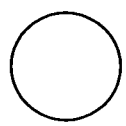
FIG. 23 illustrates a first handle grip cross section.
Figure 24:
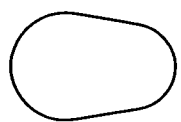
FIG. 24 illustrates a second handle grip cross section.
Figure 25:
FIG. 25 illustrates a third handle grip cross section.

Housing 14 includes an opening 24 for receiving a modular bar code reader 17 and a passage 28 providing access to an internal I/O port or connector 30, illustrated in FIG. 8, for example, which in the presently preferred embodiment comprises a USB port. Hardware contained within housing 14 will perform various functions and provide various displays on screen 16 which functions and displays do not comprise a part of the present disclosure.

The hardware in housing 14 may be activated by inserting an activation device into port 30. In the present embodiment, the activation device comprises a solid state storage device 32 having a USB interface compatible with port 30. Alternately, the electronic module could be activated using bar code reader 17 to scan a bar code carried by an authorized user—on a customer loyalty card, for example. When storage device 32 is used, information about a user on device 32 can optionally be made available to a processor in housing 14 and/or transmitted to a central server in wireless communication with electronic cart handle 10.

Memory device 32 can be used to receive and store information from information terminal 10 or a server in communication with the terminal which information a user may later access using, for example, a home computer. Where privacy is an issue, device 32 may merely contain a serial number to identify the device 32 to a secure server in communication with the electronic module. In such cases, no personal information would be stored on device 32. This would substantially prevent the disclosure of private information if a device 32 is lost. For purposes of the present disclosure, it is merely necessary to know that an authorized user can be identified to a processor in housing 14 with either device 32 or a bar code on a customer loyalty card, and that a processor in the electronic module, which may for example be in wireless communication with a server and/or the internet, can provide information to the user of the information terminal 10 based on previously stored preferences.

Figure 4:
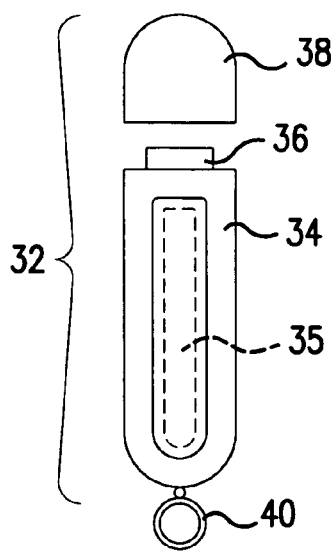
FIG. 4 is a side elevational view of a first removable memory device for use with the information terminal of FIG. 1.
Figure 27:
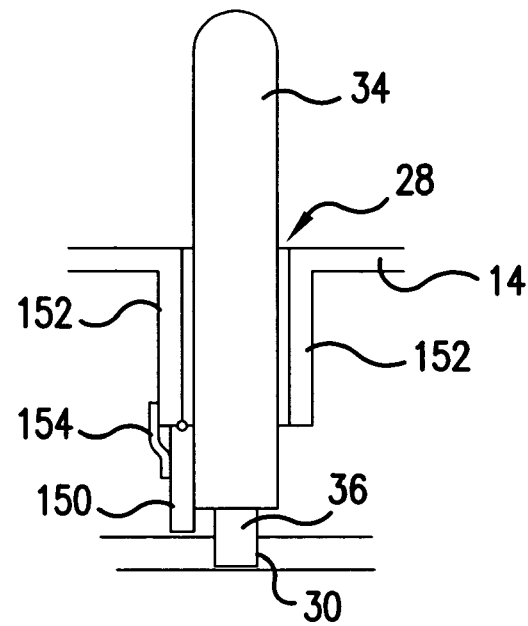
FIG. 27 is a schematic elevation view of a memory device holding open the door of FIG. 26.
Figure 29:
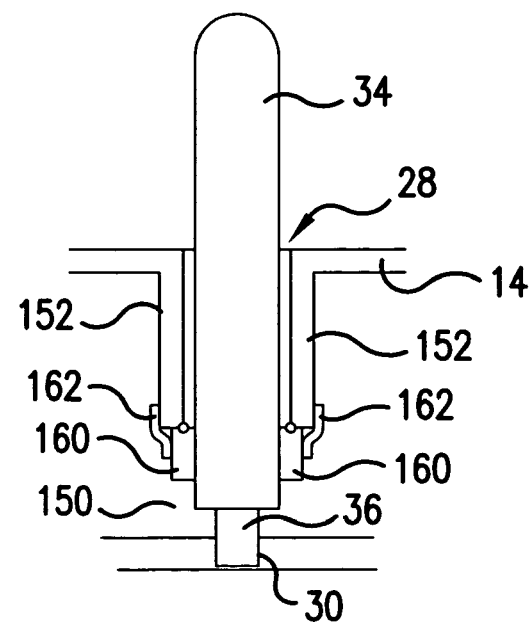
FIG. 29 is a schematic elevation view of a memory device holding open the doors of FIG. 28.

Removable memory device 32 is illustrated in FIGS. 4, 27 and 29 and includes a body portion 34 in which a suitable compact flash or other solid-state memory 35 is contained, a USB connector 36 insertable into port 30, a cap 38 and a ring 40 or similar arrangement to allow device 32 to be connected to a key ring.

As discussed above, information terminal 10 is adapted for use both indoors and out of doors and therefor must be weather resistant. For this reason, it is not practical to place an exposed USB or other I/O port on the exterior of the housing 14. Instead, with reference to FIGS. 26 and 27, it is desirable to provide a closure to protect the connector 30 and the interior of the housing. While FIG. 1 illustrates passage 28 on the upper part of housing 14, it may be provided at other locations of the housing 14 as well, and generally will be provided toward the lower portion of housing 14 and/or in an upwardly angled manner to minimize direct expose to rain and snow.

Figure 26:
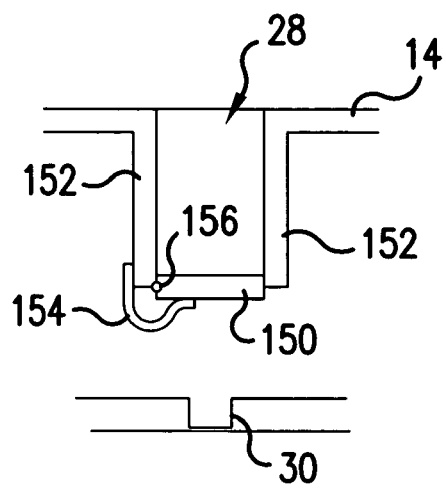
FIG. 26 is a schematic elevation view illustrating a door in the passage of FIG. 1.

In one embodiment, a door 150, illustrated in FIGS. 26 and 27 is provided in passage 28. Door 150 forms a seal with the sidewalls 152 of passage 28 to minimize the entry of moisture into this opening in housing 14. Door 150 is biased toward the closed position illustrated in FIG. 26 by a spring 154 but may be swung open on hinge 156 when memory device 34 is inserted into passage 28 as illustrated in FIG. 27. As will be appreciated from these figures, door 150 will swing closed under the influence of spring 154 when memory device 34 is removed from the housing 14.

Figure 28:
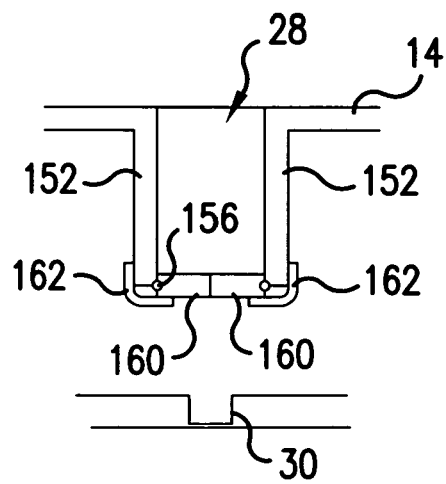
FIG. 28 is a schematic elevation view of first and second doors in the passage of FIG. 1.

FIGS. 28 and 29 illustrate a different closure arrangement for passage 28 that include first and second doors 160 in passage 28 each biased toward a closed position by a spring 162. As illustrated in FIG. 29, inserting memory device 34 in passage 28 opens doors 160 against the biasing force of springs 162 to provide access to port 30. Doors 160 return to a closed position under the influence of springs 162 when memory device 34 is removed from passage 28.

It may sometimes be desirable to provide a latch for securing a door 150 or doors 160 to reduce the chance of foreign objects being inserted into passage 28. The size of passage 28 will generally be smaller than an adult finger, but a child might be able to damage port 30 with a small stick or similar object. While an adult intent on damaging information terminal 14 will likely be able to defeat such a latch, with a hammer and a screwdriver, for example, the added security provided by a latching mechanism will deter more casual tampering with internal components.

Figure 30:
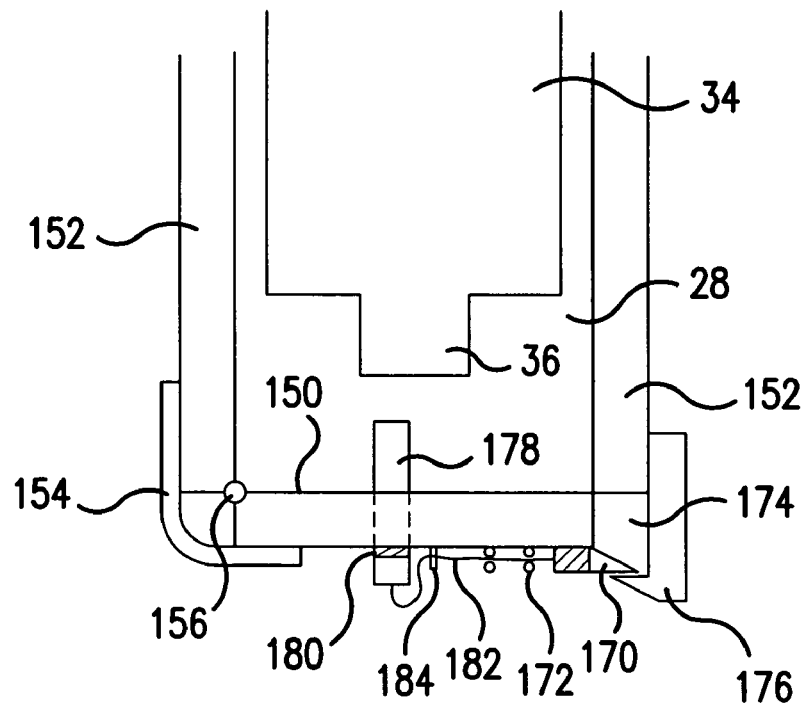
FIG. 30 is a schematic elevation view of a first latch in a latching position for securing the door of FIG. 26.
Figure 31:
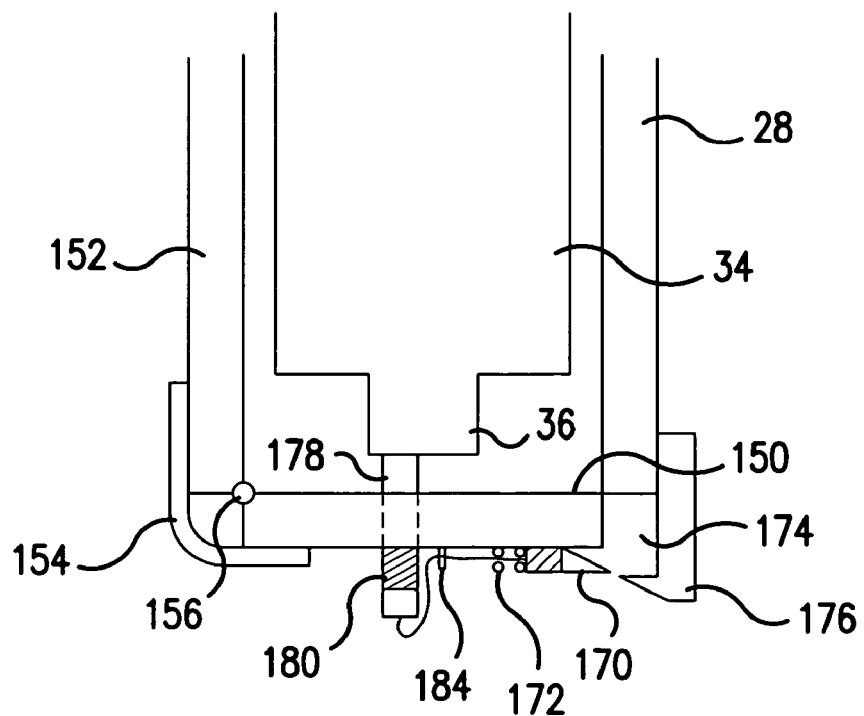
FIG. 31 is a schematic elevation view of the latch of FIG. 30 in an unlatched position.

A first latching mechanism is illustrated in FIGS. 30 and 31 installed on a door 150 of FIG. 26. This mechanism comprises a latching member 170 slidably mounted on door 150 and biased by a spring 172 into an opening 174 which may be provided in a wall of housing 14 or by a separate catch member 176 illustrated in FIGS. 30 and 31. A pin 178 extends through door 150 and is held in the raised position of FIG. 30 by a spring 180. A wire 182 is connected to one end of pin 178 and extends via a staple 184 to the end of latching member 170. When pin 178 is depressed by memory device 34 as illustrated in FIG. 31, wire 182 pulls latching member 170 away from catch member 176 and allows door 150 to open under the force of memory device 34.

Figure 32:
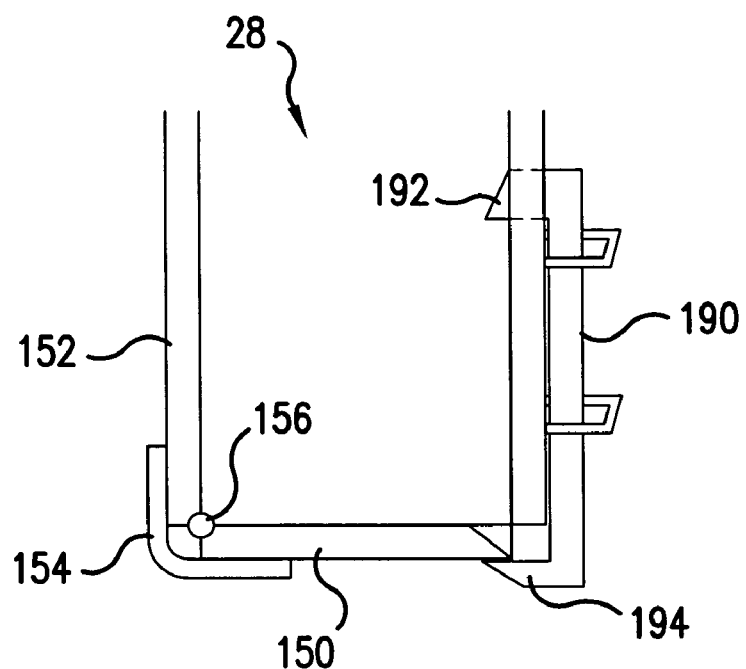
FIG. 32 is a schematic elevation view of a third latch for securing the door of FIG. 26.
Figure 33:
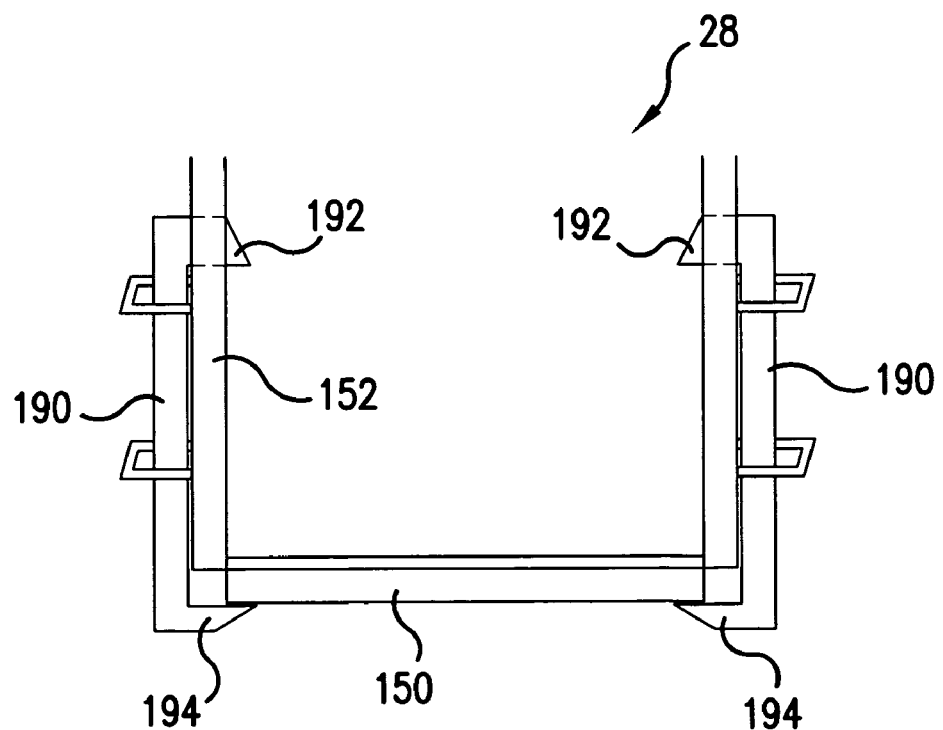
FIG. 33 is a schematic elevation view showing two of the latches of FIG. 32 securing the door of FIG. 26.
Figure 34:
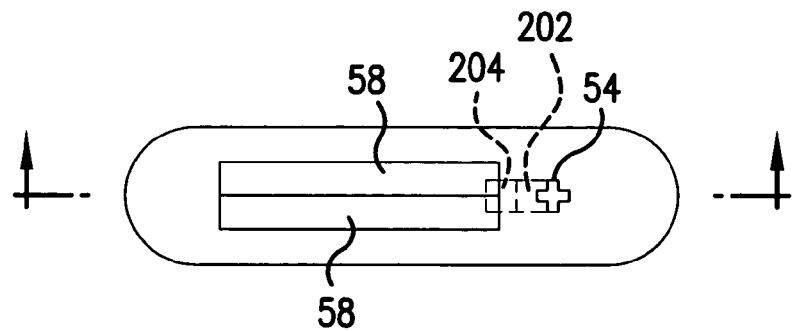
FIG. 34 is a plan view of two doors in the passage of FIG. 1.

An alternate latching arrangement is illustrated in FIGS. 32 and 33 wherein door 150 is prevented from opening by one or more latch members 190. Each of the latch members 190 includes a cam surface 192 projecting from the sidewalls 152 of passage 28 and a latch end 194 adjacent door 150. Inserting a memory device 34 into passage 28 therefore pushes outwardly on cam surface or surfaces 192 and moves latch end or ends 194 out from under door 150 thereby allowing door 150 to be opened when a memory device 34 is pressed thereagainst. Latch members 190 operate independently of one another. Therefore, when two or three latch members 190 are provided, it becomes difficult to actuate all latch member 190 simultaneously without using a memory device 34 or a similarly sized and shaped object.

Figure 5:
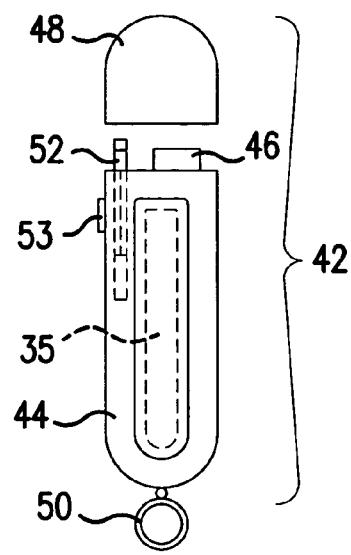
FIG. 5 is a side elevational view of a second removable memory device for use with the information terminal of FIG. 1 that includes a projection for releasing a latch on a door in the housing.
Figure 6:
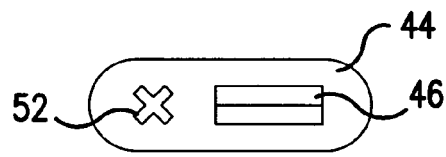
FIG. 6 is a top plan view of the removable memory device of FIG. 5 with its cap removed.
Figure 7:
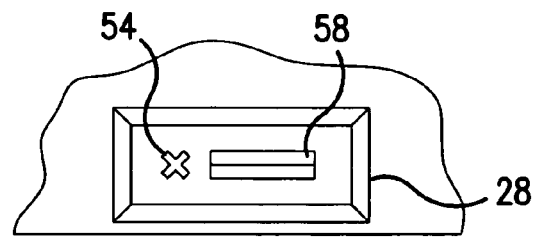
FIG. 7 illustrates a passage in the housing of FIG. 1 for receiving the memory device of FIG. 5.
Figure 35:
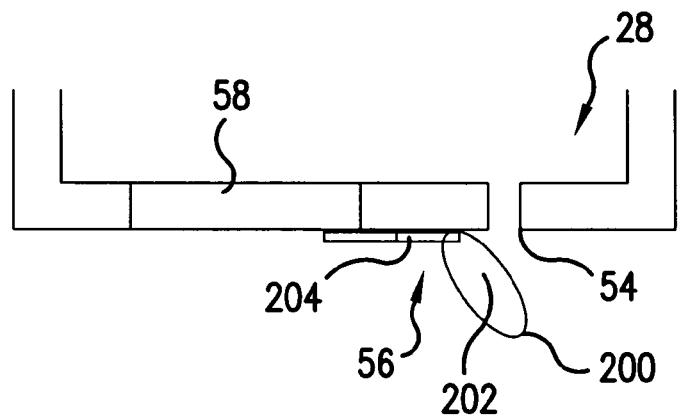
FIG. 35 is an elevational view schematically illustrating a latch for securing the doors of FIG. 34.
Figure 36:
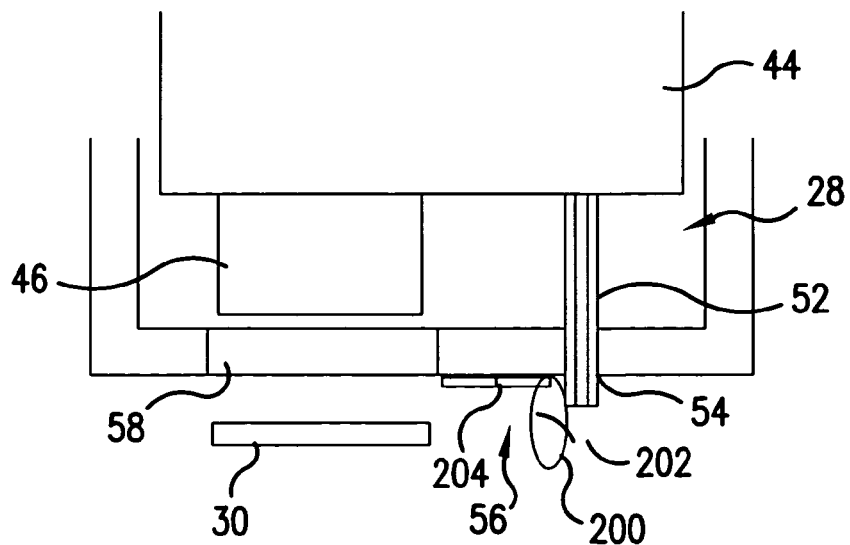
FIG. 36 is an elevational view schematically showing the latch of FIG. 35 being opened by the memory device of FIG. 5.

An alternate memory device 42 is illustrated in FIG. 5. Memory device 42, in addition to a body portion 44 holding solid state memory 35, a USB connector 46, a cap 48 and a ring 50, includes a projection or key member 52 having a predetermined shape, which is a cross in the present embodiment. The shape of key member 52 matches the shape of a key opening 54, illustrated in FIGS. 7 and 34-36, in a housing adjacent port 30. Key member 52 fits into key opening 54 when memory device 42 is used. Key member 52 projects further from body 44 than connector 46 and thus enters key opening 54 and actuates a release mechanism 56 which unlocks doors 58 over port 30. Release mechanism 56 includes a cam 200 pivotable about an axis 202 and connected to a latch 204 so that pressure applied by projection 52 against cam 200 turns the cam and pulls latch 204 away from door 58, thereby allowing doors 58 (only one of which is shown in FIGS. 35 and 36) to swing inwardly under when USB connector 46 presses thereagainst. And, because projection 52 extends further from memory device housing 44 than USB connector 46, latch 204 remains the retracted position illustrated in FIG. 36 until doors 58 have closed behind memory device 42 as it is withdrawn from passage 28. This arrangement makes it more difficult for a user to use an unauthorized device in USB port 30. Key 52 may be retractable, with a thumb slide 53, for example, as illustrated in FIG. 5, to make USB drive 30 usable with standard USB ports, such as the ports found on a user's home computer.

In addition to activating electronic modules in housing 14, the insertion of memory device 32 or 42 can perform a security function as well. As illustrated in FIGS. 9-12, the cart 59 to which information terminal 10 is attached may include a wheel locking arrangement for securing the wheels 60 of shopping carts. These wheel locking devices may comprise a solenoid 62 for selectively driving a rod 64 into an opening in wheel 60 to substantially prevent wheel 60 from turning. Solenoid 62 is controlled by signals from the processor in housing 14 and only unlocks wheels 60 when an authorized memory device 32, 42 is inserted into port 30.

Figure 12:
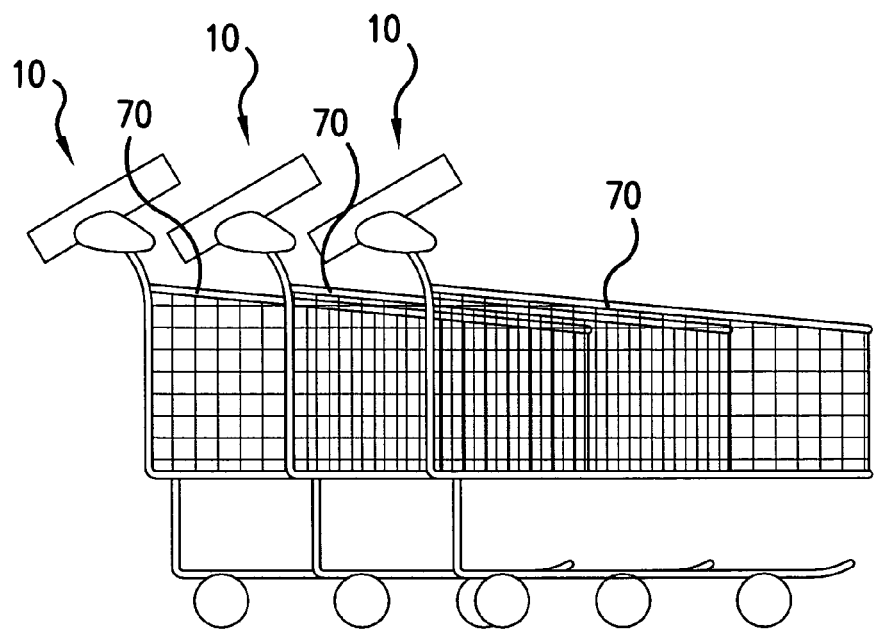
FIG. 12 schematically illustrates the nesting of several shopping carts which carts include the information terminals of FIG. 1.

FIG. 12 illustrates a plurality of nested shopping carts 70 equipped with information terminals 10. The size and position of housing 14 substantially prevents the terminals 10 from interfering with cart nesting when mounted on a variety of standard carts. In addition, information terminal 10 is preferably mounted so that display 16 makes an angle of about 30 degrees with respect to the horizontal to improve visibility and minimize glare, while not interfering with the use of a child seat in the cart or with cart nesting.

Figure 13:
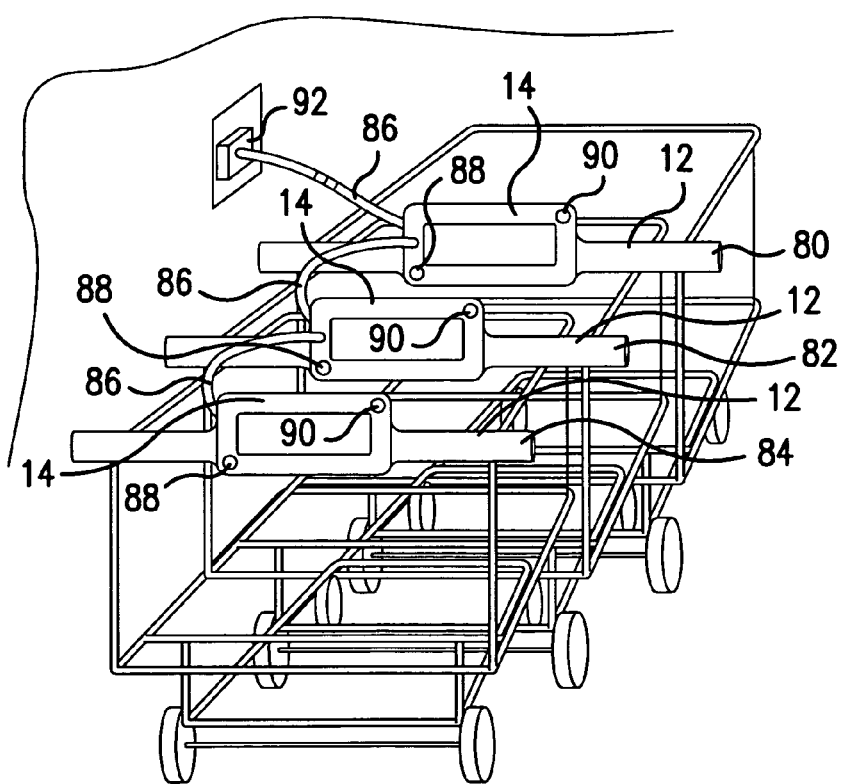
FIG. 13 is a perspective view of several nested carts that include the information terminals of FIG. 1 wherein the information terminals are electrically interconnected for battery recharging.

FIG. 13 illustrates a daisy chain arrangement for recharging batteries 15 contained within housing 14 of a plurality of nested carts 80, 82, 84. As will be apparent from these figures, each housing 14 includes a power cord 86, a power outlet 88 and a power LED 90 which lights when power is being supplied to the cart on which LED 90 is mounted. The power cord 86 on first cart 80 is attached to a suitable DC power source 92 (such as a transformer connected to an AC power source), the power cord 86 of second cart 82 plugs into power outlet 88 of the first cart 80, and the power cord 86 of third cart 84 plugs into power outlet 88 of second cart 82. LED's 90 on each cart turn on when that cart is connected to a source of electric power. In this manner, it can readily be determined whether all carts in a nested series are being recharged. This arrangement is best suited for a last-in first-out arrangement of carts and therefore is primarily intended for situations wherein groups of carts are connected and fully charged, overnight, for example, before being used by purchasers. In an alternate arrangement, each of the plurality of nested carts could be plugged individually into a power source until fully charged. This would allow for the carts that have been charging the longest to be removed from a series of carts first, over the course of a business day.

Figure 14:
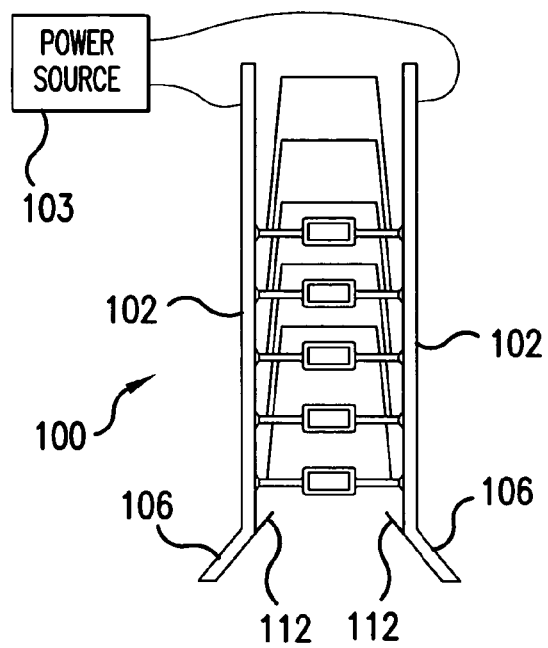
FIG. 14 illustrates a plurality of nested carts including a second embodiment of an information terminal connected to a handle according to the present invention having batteries being recharged by a corral having charging rails.
Figure 15:
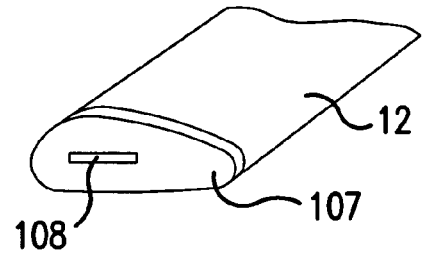
FIG. 15 is a perspective view of one end of the handle of FIG. 14.
Figure 16:
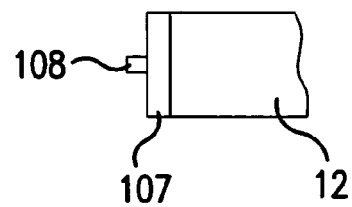
FIG. 16 is an elevational view of the end of the handle of FIG. 15.
Figure 17:
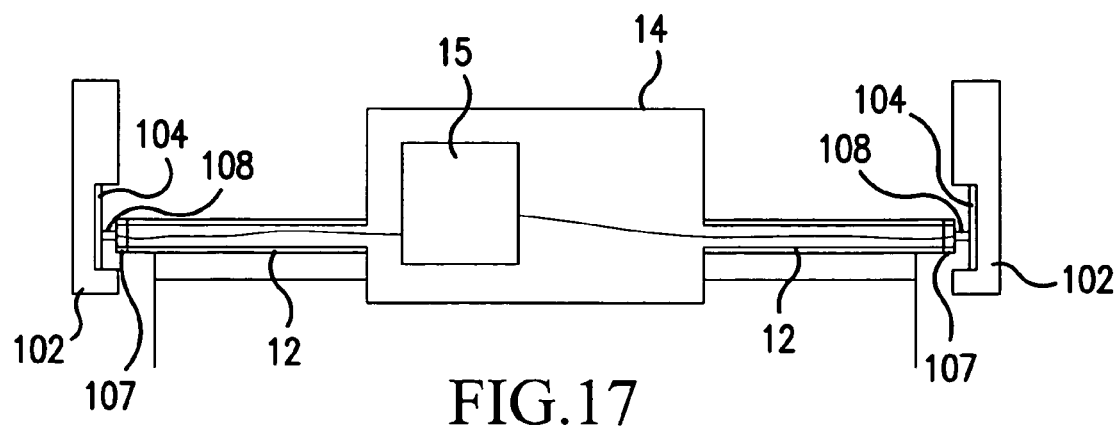
FIG. 17 schematically illustrates an information terminal mounted on a handle connected between two charging rails of the corral of FIG. 14.

FIG. 14 illustrates a cart corral 100 having first and second rails 102 each of which is provided with an electrically conductive charging rail 104, best seen in FIG. 17, connected to a power source 103. Corral 100 includes first and second angled guide members 106 for guiding a cart into the corral. Electrical contacts 108 on the ends of grip portions 12 make electrical contact with these charging rails to recharge a battery 15 inside housing 14. The contacts 108 may alternately be formed in separate end caps 107 which can be attached to the grip portions 12 after grip portions 12 are cut to a proper length. Either contacts 108 or charging rails 104 may be flexible or displaceable to ensure a good electrical connection between contacts 108 and charging rail 104 even when the separation between rails 102 and or the separation between the ends of handle 10 is not constant. Alternately, end caps 107 can be telescopically mounted within handle grip portions 12 and spring biased away from one another to accommodate variations in the separation between the charging rails. Corral 100 may further includes hinged flaps 112 or similar structures to ensure that carts pass through the corral in a single direction and that the cart that has been charging for the longest period time is removed first to provide for first in first out recharging.

Figure 18:
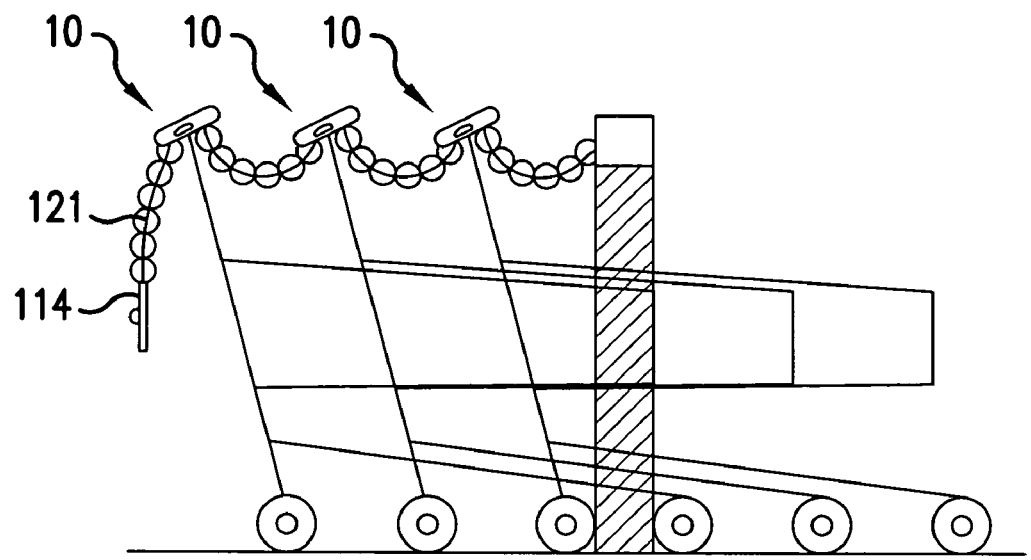
FIG. 18 illustrates a third embodiment of the information terminal in which electrical connectors are integrated with a locking device for securing adjacent carts to one another.

FIG. 18 illustrates a charging system integrated into a daisy chain cart security system. In such a security system, nested carts are secured by inserting a member 114 chained to one cart into a slot 116 on an adjacent cart. The member 114 may be released by inserting a coin or token to release a single cart. The coin or token is returned when the cart is returned to the nested line of carts after use. An example of such a daisy chain locking system (which does not include the electrical charging system of the present invention) is illustrated in U.S. Pat. No. 4,474,282 to Lenader, the contents of which are hereby incorporated by reference.

Figure 19:
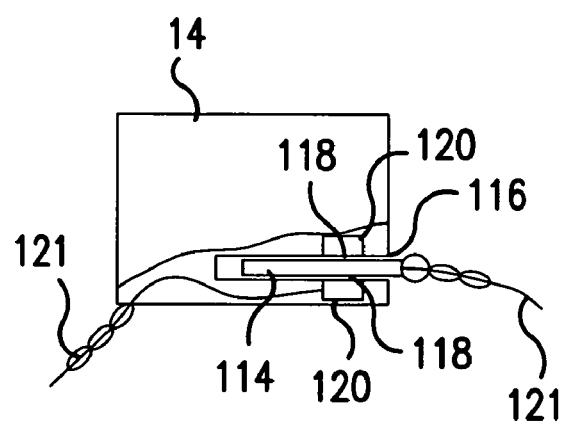
FIG. 19 illustrates one of the electrical connectors of FIG. 18 in a housing on an adjacent cart.
Figure 20:
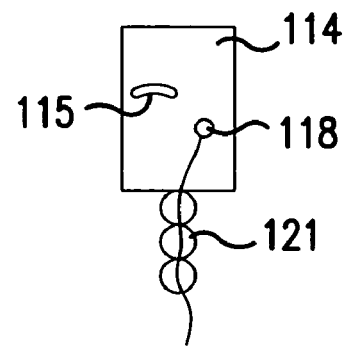
FIG. 20 is a plan view of the connector end of FIG. 19.

As illustrated in FIGS. 19 and 20, member 114 includes a hasp 115 that connects to a locking mechanism in slot 116 and electrical contacts 118 that engage electrical contacts 120 in slot 116 to electrically connect two carts. Electrical contacts 120 in slot 116 are in turn connected by wire 121 to the electrical contacts 118 of a member chained to that cart which can be inserted into a slot 116 of an adjacent cart in a similar manner to electrically connect and mutually secure a plurality of nested carts in series.

Figure 21:
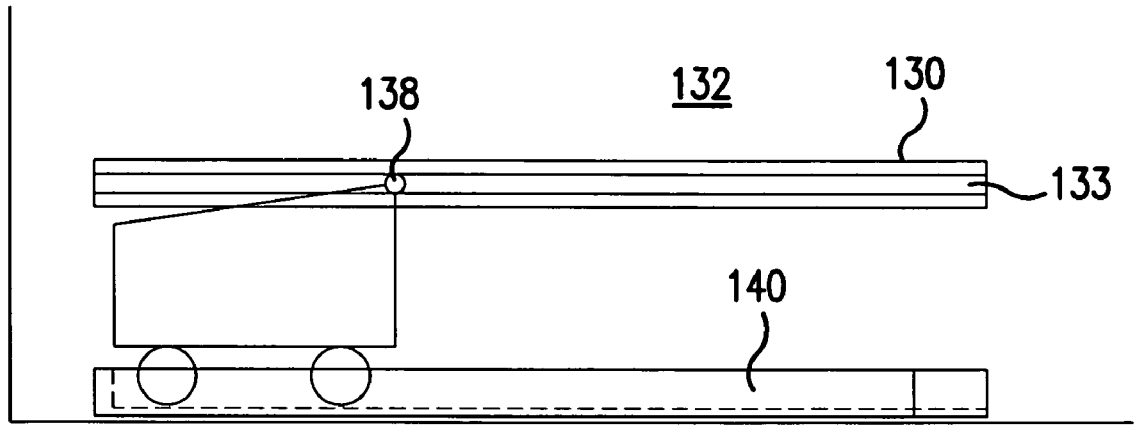
FIG. 21 illustrates a charging rail and guide channel arrangement for charging the battery of an information terminal connected to a handle.
Figure 22:
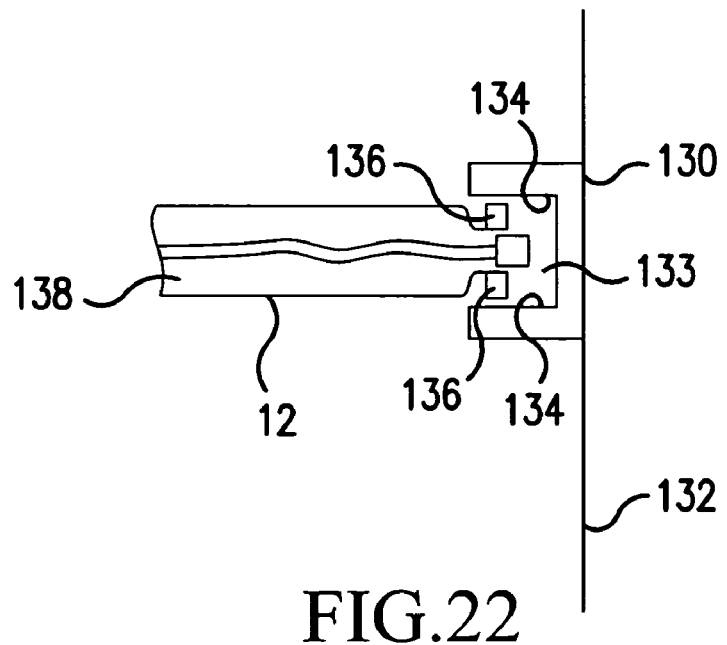
FIG. 22 is a sectional view of an end of the handle and charging rail of FIG. 21.

FIG. 21 illustrates a recharging system that comprises a single rail 130, mounted, for example on a wall 132. Rail 130 includes a channel 133 in which a pair of spaced electrical contacts 134 are mounted, one above the other for making electrical contact with a pair of vertically projecting electrical contacts 136 on the end of a cart handle 138. A guide channel 140 is provided on the ground adjacent rail 130 to help guide the cart wheels and properly position cart handle 138 with respect to rail 130. This arrangement is space-efficient and allows for the recharging of a battery through a single end of a cart handle.

The present invention has been described herein in terms of several preferred embodiments. Obvious additions and modifications will become apparent to those skilled in the relevant arts upon a reading of the foregoing description. It is intended that all such obvious modifications and additions be included within the scope of this invention.

We claim:

1. A system comprising a portable information terminal mountable on a shopping cart for providing product and advertising information while the cart is moved inside a store and an external memory device connectable to the portable information terminal, the external memory device comprising:
    a memory housing;
    a non-volatile memory storing data in the memory housing;
    a first electrical connector projecting from the housing for allowing a processor to access the stored data; and
    a key member projecting into the memory housing farther than the first electrical connector for actuating a release mechanism of at least one door of the portable terminal;

the portable terminal comprising:
    a terminal housing including a display;
    a processor in the terminal housing for causing the display to display product information and advertisements;
    a second electrical connector inside the housing complementary to the first electrical connector for connecting an external memory device to the processor;
    the terminal housing including a passage providing access to the second electrical connector from outside the terminal housing, and said at least one door recessed in said passage shiftable from a first position blocking said passage to a second position by inserting the external memory device into the passage; and
    a latch, slidably mounted on and laterally slidable using said release mechanism with respect to said at least one door and shiftable between a latched position preventing said at least one door from shifting from said first position to said second position and an unlatched position allowing said at least one door to be shifted from said first position to said second position.

2. The system of claim 1 wherein said memory housing has a cross sectional shape and said passage has a shape complementary to said cross sectional shape for slidably receiving said memory housing.

3. The system of claim 1 wherein said latch includes an actuating portion projecting into said channel.

4. The system of claim 3 wherein said memory housing includes a portion for engaging said actuating portion.

5. The system of claim 4 wherein said actuating portion is positioned to be actuated by said first electrical connector when said memory device is inserted into said passage.

6. The system of claim 3 wherein said latch includes an actuating portion on said at least one door.

7. The system of claim 1 including at least two latches each shiftable between a latched position preventing said at least one door from shifting from said first position to said second position and an unlatched position allowing said at least one door to be shifted from said first position to said second position.

8. The system of claim 1 wherein said at least one door is spring biased toward said first position.

9. The system of claim 1 wherein said memory housing includes a projection adjacent to said first electrical connector for shifting said latch to said unlatched position.

10. The system of claim 1 wherein said at least one door comprises first and second doors.

11. The system of claim 1, wherein the latch, positioned on a first side of said door, when in the latched position, prevents the door from opening when a force is applied on a second side of said door.

12. The system of claim 1, wherein the latch is slidably engagable with a separate catch member.

13. A portable information terminal mountable on a shopping cart for providing product and advertising information while the cart is moved inside a store comprising:

a housing including a display;

a processor in the housing for causing the display to display product information and advertisements;

a second electrical connector inside the housing for connecting an external memory device to the processor, wherein the second electrical connector is complementary to a first electrical connector projecting from the external memory device, and wherein the external memory device comprises a key member projecting farther than the first electrical connector;

the housing including a passage providing access to the second electrical connector from outside the housing, at least one door recessed in said passage and shiftable between a first position blocking said passage and a second position by inserting the external memory device into the passage, and a release mechanism of said at least one door, wherein said release mechanism is actuated by the key member of the external memory device; and a latch, slidably mounted on and laterally slidable using said release mechanism with respect to said at least one door and shiftable between a latched position preventing said at least one door from shifting from said first position to said second position and an unlatched position allowing said at least one door to be shifted from said first position to said second position.

14. The portable information terminal of claim 12 wherein said at least one door comprises at least one door hingedly connected to the housing.

15. The portable information terminal of claim 13 wherein said latch includes an actuating portion projecting into said channel.

16. The portable information terminal of claim 13 wherein said latch includes an actuating portion on said at least one door.

\* \* \* \* \*